United States Patent [19]
Burroughs et al.

[11] 3,854,319
[45] Dec. 17, 1974

[54] ALCOHOLIC BREATH SIMULATOR

[75] Inventors: James E. Burroughs, Mount Prospect; Joseph P. Hoppesch, Streamwood, both of Ill.

[73] Assignee: Borg-Warner Corporation, Chicago, Ill.

[22] Filed: Oct. 16, 1972

[21] Appl. No.: 298,082

[52] U.S. Cl. .................................... 73/1 A, 23/254
[51] Int. Cl. ........................................... G01n 31/00
[58] Field of Search ......... 73/1 R; 23/232 R, 253 R; 261/95, 96, 94

[56] References Cited
UNITED STATES PATENTS

| | | | |
|---|---|---|---|
| 3,249,403 | 5/1966 | Bochinski et al. | 23/253 R |
| 3,520,194 | 7/1970 | Adams | 73/1 R |
| 3,595,607 | 7/1971 | Gores | 261/95 |
| 3,665,748 | 5/1972 | Mator | 73/1 R |

OTHER PUBLICATIONS

Jetter, et al., Studies in Alcohol. IV A New Method for the Determination of Breath Alcohol, Am. J. Path. Tech., Vol. 5, pp. 75–88, 1941.

*Primary Examiner*—S. Clement Swisher
*Attorney, Agent, or Firm*—James E. Tracy

[57] ABSTRACT

A breath sample, having a fixed known alcohol content, is useful for calibrating or checking the performance of an alcoholic breath analyzer. Such a standard alcoholic breath sample may be simulated by blowing non-alcoholic breath through an elongated enclosure maintained at a given temperature and containing alcohol vapor continuously generated from an abosrbent material impregnated with an alcohol-water solution. The breath produced at the enclosure's outlet will constitute a simulated breath sample having a known alcohol concentration.

5 Claims, 1 Drawing Figure

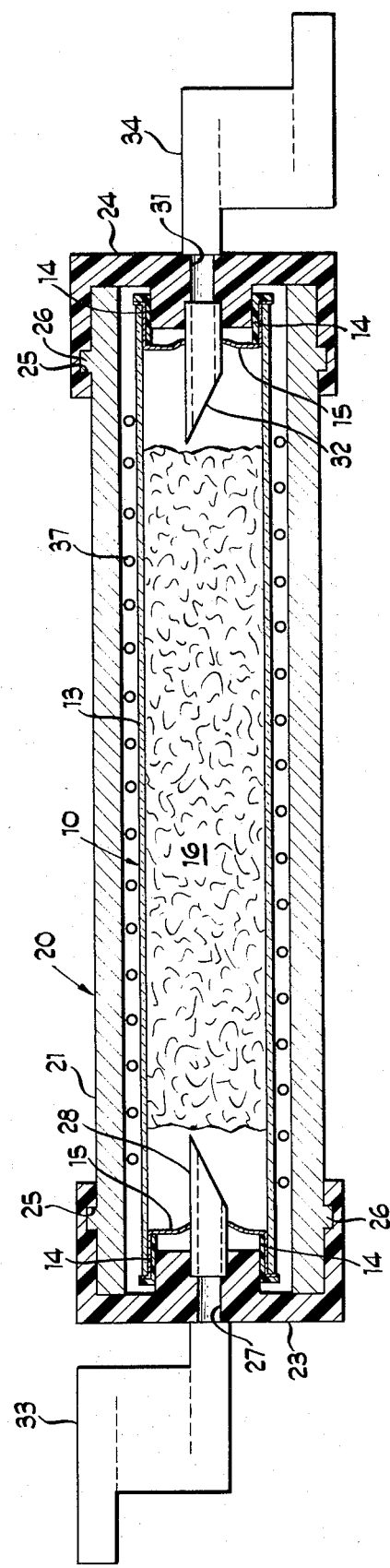

ALCOHOLIC BREATH SIMULATOR

BACKGROUND OF THE INVENTION

Various breath analyzing devices have been developed, primarily for law enforcement agencies, for ascertaining the alcohol content of expired air from persons suspected of being inebriated in order to determine whether such persons are intoxicated in accordance with existing statutes. To insure that a breath analyzer functions properly and provides accurate test results, periodic calibration or performance checks are customarily conducted. This is best achieved by performing a breath test with a breath sample having a known alcohol concentration. In this way, if the breath analyzer is functioning properly, the results of such a test will be in agreement with the alcohol concentration of the standard breath sample.

All of the devices developed heretofore for producing standard breath samples suitable for calibration and performance appraisal testing are relatively expensive, complex and cumbersome. These devices require the use of large volumes of aqueous alcohol solutions that must be carefully prepared by accurately measuring out specified volumes of pure ethyl alcohol and distilled water, and this preparation must take place just prior to useage. Each user must therefore locate a supplier of 190 or 200 proof ethyl alcohol and distilled water for the preparation of the calibration solution. In addition, he must maintain volumetric paraphenalia for dispensing and diluting these reagents in their proper ratios. Another disadvantage arises when such devices are employed for calibrating breath analyzers in the field, such as is the case when a breath analyzer is located in a police car. In such incidents, versatility and other desirable characteristics are notably absent.

The present invention circumvents these deficiencies and disadvantages. The disclosed alcoholic breath simulator is relatively compact, portable, uncomplicated and inexpensive. It is readily adapted for both laboratory and field applications. Most importantly, it obviates the need for local procurement of pure ethyl alcohol and the preparation of solutions.

SUMMARY OF THE INVENTION

An alcoholic breath simulator, constructed in accordance with the invention, comprises an enclosure containing an absorbent material which has been impregnated with a solution including ethyl alcohol to produce a concentration of alcohol vapor within the enclosure. There is an inlet to the enclosure and an outlet from the enclosure. The introduction of alcohol-free gas into the inlet results, when the enclosure is maintained at a given temperature, in the development and delivery at the outlet of a standard alcohol-gas sample which provides a simulated breath sample having a known alcohol concentration and is suitable for calibrating or checking the performance of breath alcohol analyzers.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing, the single FIGURE of which illustrates, partially in section, an alcoholic breath simulator constructed in accordance with one embodiment of the invention.

DESCRIPTION OF THE ILLUSTRATED EMBODIMENT

Briefly, the disclosed alcoholic breath simulator features a pre-packaged, disposable, sealed enclosure 10 which retains alcohol vapor until calibration or performance appraisal of a breath analyzer is desired. At that time, the sealed enclosure is punctured at both ends and an alcohol-free carrier gas, such as non-alcoholic breath, is blown through the enclosure. The alcohol vapor combines with the non-alcoholic gas so that the vapors received by the breath analyzer will constitute a simulated breath sample having a known concentration of alcohol. Enclosure 10 is illustrated in its operational state, namely with its ends pierced by elements of the breath simulator to facilitate the flow of the carrier gas into and out of the enclosure.

More specifically, enclosure 10 comprises a cylindrical tube 13, preferably made of glass. Each end is sealed and made air-tight by a plastic cap 14 and a sheet of plastic film 15. The caps 14 and the films 15 may be attached to the ends of tube 13 merely by friction. Before the ends are sealed during assembly of enclosure 10, a suitable absorbent material 16, such as cotton gauze, is inserted within tube 13. A predetermined amount of a specified mixture of ethyl alcohol and water is then poured into tube 13. As long as the ends of the tube remain air-tight, the alcohol vapor produced therein will remain in a useable state for the intended application. It is apparent, of course, that enclosure 10 could be produced by one or more manufacturers and then supplied to any law enforcement agency that wishes to calibrate their breath analyzing equipment by use of the simulator described herein. In this way, it would no longer be necessary for these agencies to procure pure ethyl alcohol locally or to prepare the precise mixtures of alcohol and water which are required for other types of simulators. Furthermore, the needs for volumetric paraphenalia and storage facilities are obviated, and spillage losses can never occur.

Enclosure 10 may most conveniently be utilized for performing calibration checks by inserting it into an enveloping holder 20 which comprises a cylindrically-shaped tube 21, preferably fabricated from a material of good insulation qualities, and a pair of end caps 23 and 24 which are fabricated of similar material and attach to tube 21 in any convenient manner. For example, the end caps may be threaded so that they can be screwed onto tube 21 or, as illustrated in the drawing, each of the caps may be provided with an annular slot or groove 25 that mates with an annular lug 26 formed on tube 21. End cap 23 has a central opening or bore 27 that communicates with a metallic pointed tube 28 affixed to the cap and extending into the chamber defined by holder 20. In similar fashion, end cap 24 has a central aperture 31 that communicates with a pointed metallic tube 32. As illustrated, holder 20 and enclosure 10 are appropriately dimensioned so that when enclosure 10 is inserted into tube 21 and end caps 23 and 24 are attached or secured to tube 21, tubes 28 and 32 will perforate the plastic films or membranes 15, thereby providing an inlet at one end of enclosure 10 (for example the left end in the drawing) and an outlet at the other or right end. Disposable splash or saliva traps 33 and 34 are connected respectively to inlet end cap 23 and outlet end cap 24. Enclosure 10 is preferably maintained at a given temperature for optimum performance. This is achieved by a cylindrical shaped heater that forms a jacket around the outside of enclosure 10 between glass tube 13 and insulating tube 21. As illustrated, the required heating is accomplished by a heating coil 37 through which current passes.

When enclosure 10 is positioned within holder 20 as shown, a calibration check of a breath analyzing device may be made by the operator by merely connecting trap 33 to the inlet of the device and blowing alcohol-free breath or gas through trap 33, opening 27 and tube 28 and into enclosure 10. The alcohol-free gas so introduced combines with and displaces the alcoholic vapor emanating from the alcohol-impregnated absorbent material 16, resulting in the delivery of an alcohol-gas mixture through tube 32, opening 31 and trap 34 and then into the inlet of the alcoholic breath analyzing instrument. By appropriate selection of parameters, particularly with respect to the alcohol concentration of the alcohol-water solution absorbed in material 16 and the temperature of the enclosure, the alcohol-gas mixture developed at the outlet of enclosure 10 will constitute a standard alcoholic breath sample. In other words, it provides a breath sample simulated to contain a known alcohol concentration. If the output data from the breath analyzer is in disagreement with the alcohol concentration delivered by the simulator, then it indicates that the breath analyzer is not performing properly.

In a typical application of the invention, the alcohol content of the simulated breath sample would be equivalent to 0.10 percent B.A.C. (blood alcohol concentration). Such a concentration is employed throughout the United States and represents intoxication under existing statutes of many of the states.

As previously mentioned, the alcohol level of the simulated breath sample is a function of temperature as well as of other parameters. Therefore, different alcohol concentrations may be produced within a simulator by varying the temperature of the alcohol-water mixture. Hence, in one practical embodiment of the invention a temperature controller would be included for varying the temperature of enclosure 10. Alternately, several enclosures containing specific concentrations of alcohol-water mixtures impregnated on absorbent materials may be supplied, such that when heated to a specific isothermal condition will generate simulated breath standards covering a wide range of B.A.C. concentrations.

Enclosure 10 may be designed for either single or extended useage. Its useful life is dependent on several parameters. Preferably, a single enclosure 10 would be capable of making calibration checks of several breath analyzers. In other words, the alcohol concentration will not change significantly until breath, air or other displacing gas has been passed through the enclosure at volumes exceeding the design capabilities of the enclosure.

While a particular embodiment of the invention has been shown and described, modifications may be made, and it is intended in the appended claims to cover all such modifications as may fall within the true spirit and scope of the invention.

We claim:

1. A device useful in simulating alcoholic breath to calibrate breath analyzers, comprising:
   a disposable, elongated sealed enclosure containing an absorbent material which has been impregnated with a solution including ethyl alcohol to produce a concentration of alcohol vapor within said enclosure,
   the alcohol-impregnated absorbent material substantially filling said enclosure but providing ample air passages to permit the free flow of breath through the enclosure under normal breath pressures,
   the ends of said enclosure being pierceable in order that a simulated breath sample, having a known alcohol concentration, will evolve from one end of said enclosure in response to blowing of alcohol-free breath at normal breath pressures into the other end when said enclosure is maintained at a given temperature,
   the alcohol-free breath displacing the alcohol vapor produced by the alcohol-impregnated absorbent material.

2. An alcoholic breath simulator comprising: a disposable, sealed enclosure containing an absorbent material which has been impregnated with a solution including ethyl alcohol to produce a concentration of alcohol vapor within said enclosure,
   the alcohol-impregnated absorbent material substantially filling said sealed enclosure but providing ample air passages to permit the free flow of breath through the enclosure under normal breath pressures;
   and means for piercing said sealed enclosure at two different locations and providing an inlet at one location and an outlet at the other location,
   blowing of alcohol-free breath at normal breath pressures into said inlet resulting, when said enclosure is maintained at a given temperature, in the displacement of the alcohol vapor and the development and delivery at said outlet of a standard alcohol-gas sample to provide a simulated breath sample having a known alcohol concentration.

3. An alcoholic breath simulator according to claim 2 in which said sealed enclosure is an elongated tube, in one end of which said inlet is inserted while said outlet is inserted in the outer end.

4. An alcoholic breath simulator according to claim 2 in which said inlet and said outlet each includes a pointed metallic tube for piercing said sealed enclosure.

5. An alcoholic breath simulator according to claim 2 in which said enclosure is a cylindrical glass tube the ends of which are sealed with plastic films which are pierceable to permit the insertion of said inlet at one end and said outlet at the other.

* * * * *

UNITED STATES PATENT OFFICE
CERTIFICATE OF CORRECTION

Patent No. 3,854,319                    Dated December 17, 1974

Inventor(s) James E. Burroughs et al.

It is certified that error appears in the above-identified patent and that said Letters Patent are hereby corrected as shown below:

Column 4, line 51, change "outer" to read -- other --.

Signed and sealed this 4th day of March 1975.

(SEAL)
Attest:

RUTH C. MASON
Attesting Officer

C. MARSHALL DANN
Commissioner of Patents
and Trademarks